Aug. 11, 1925.

A. L. JOHNSTON, JR 1,549,262

LOCK CONNECTER FOR ANTISKID CHAINS AND THE LIKE

Filed March 3, 1921

INVENTOR
A. L. Johnston Jr.
BY
Duell, Warfield & Duell
ATTORNEY

Patented Aug. 11, 1925.

1,549,262

UNITED STATES PATENT OFFICE.

ANDREW LANGSTAFF JOHNSTON, JR., OF NEW YORK, N. Y., ASSIGNOR, BY MESNE ASSIGNMENTS, TO OFF'N'ON CHAIN CORPORATION, OF NEW YORK, N. Y., A CORPORATION OF DELAWARE.

LOCK CONNECTER FOR ANTISKID CHAINS AND THE LIKE.

Application filed March 3, 1921. Serial No. 449,491.

*To all whom it may concern:*

Be it known that I, ANDREW LANGSTAFF JOHNSTON, Jr., a citizen of the United States, residing at New York, in the county of New York and State of New York, have invented certain new and useful Improvements in Lock Connecters for Antiskid Chains and the like, of which the following is a full, clear, and exact description, such as will enable others skilled in the art to which it appertains to make and use the same.

This invention relates to anti-skid chains for automobile tires, and more particularly to such devices having improved fastening means.

It is an object of the invention to provide reliable and efficient anti-skid chains capable of quick and easy application to a tire.

It is a further object of the invention to provide simple and secure fastening means for anti-skid chains.

Another object of the invention is to provide an anti-skid chain capable of inexpensive manufacture and assembly.

Other objects will be in part obvious and in part pointed out hereinafter.

Figure 1:
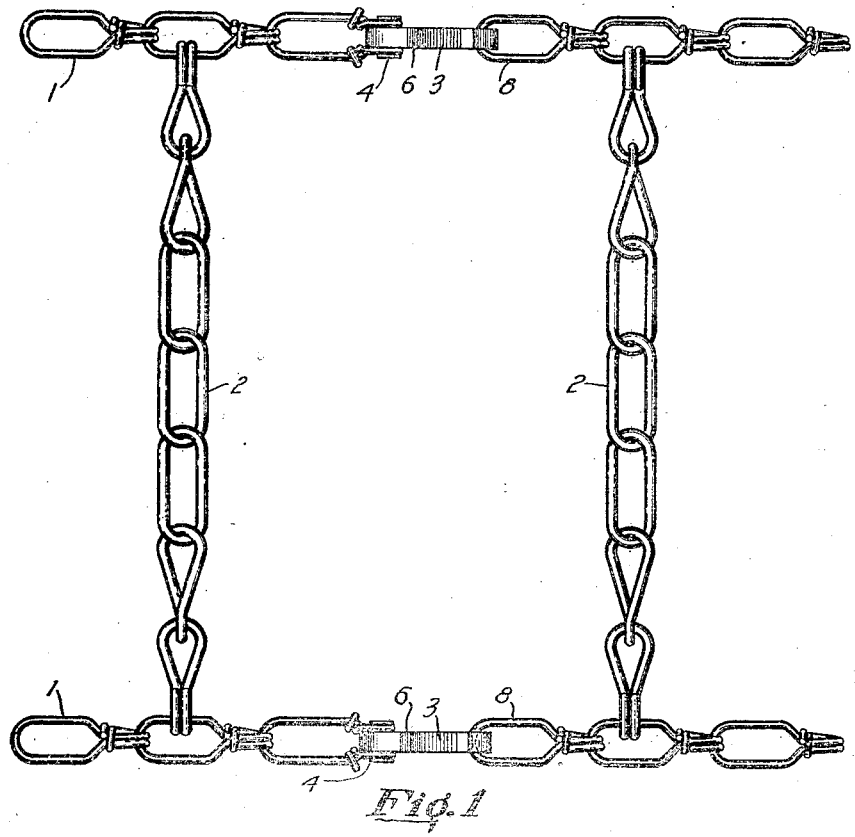
Figure 2:
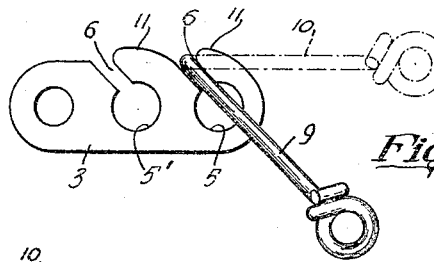
Figure 3:
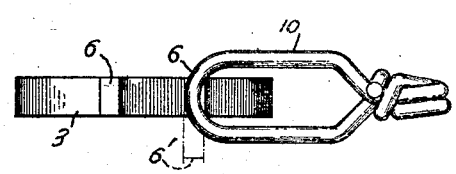

In the accompanying drawings wherein is illustrated a preferred embodiment of the invention, Figure 1 is a plan view of a portion of anti-skid chain embodying the invention;

Fig. 2 is an enlarged side view of the improved hook link and adjacent chain links; and Fig. 3 is a similar top view.

In general arrangement of parts and in function the apparatus employed is similar to standard devices for the prevention of skidding. Two circumferential side chains 1—1 adapted to be fastened snugly against the tire are joined by a plurality of cross chains 2 which, in use, pass over the tread of the tire and furnish ground gripping means for avoiding slipping. The links of the side chains may be of any suitable construction and a preferred form is illustrated in which each link is formed from a single strand of chain wire bent into a large loop the free ends of which are further looped into eyes and bent to encircle and reinforce the neck of the eyes. The cross chains may be of standard construction. The present improvement consists principally in the fastening means for joining the ends of the side chains and comprises hook links 3 which may be permanently carried by a chain terminal link as by means of a rivet 4 fastened through an aperture in the link and through the eye of a chain link. Each of the links 3 is provided with one or more eyes 5 substantially circular in shape having a restricted entrance slot 6 preferably entering the eye 5 in a direction oblique to the center line of the link 3 and (as shown) toward the chain end link whose loop is to be slipped through the slot. In order to remove or apply a chain link 8 to the hook link 3 the chain link is tilted to the position 9 (Fig. 2) when the plane of its loop becomes parallel to the plane of the slot 6. At this inclined position the loop of the link passes readily through the slot 6 thus connecting or disconnecting the ends of the chain.

As shown more clearly in Fig. 3, when the chain end link assumes the position 10 approximately on a line with or parallel to the center line of the hook link the curve of the loop of the link will be prevented by the corners of the slot 6 from passing through the slot, the thickness of the hook link 3 being great enough to assure such an obstruction. Considered geometrically, the width of the slot 6 is made slightly greater than the diameter of the strand of the link 10 but less than the altitude 6' of the segment formed by that portion of the curve of the loop of the link 10 intercepted by the sides of the hook link 3 under normal conditions. The end of the chain link should have sufficient curvature to cause an appreciable difference to exist between the diameter of the strand and the projected thickness of the intercepted portion of the curve, as shown. The passage 6 is preferably inclined inwardly toward the entering chain link to form a more efficient hook and thus to increase resistance to displacement. The portions 11 of the hook 3 may be slightly raised whereby, in mounting the chain, the end link can be caught on the raised portion 11 and then turned, with a leverage action, to snap in place. When the chains are in use the link of the chain engaged by the hook link will ordinarily assume the position of the link 8 (Fig. 1) and from such a position the curvature of the loop of the link will prevent passage through the slot as described, upon any play of the link within the eye, thus precluding accidental disengagement. A second similar eye 5' is preferably provided to allow adjustment for the purpose of keeping the chains taut at all times. Operative tension on both the side chains and cross chains when in use tends to keep all parts in substantially rigid relationship and any slight displacement allowed is insufficient to bring the parts to the exact position necessary for disengagement.

It will be noted that no special construction of the links of the chain, and no extra parts for locking are required; the slot of the hook cooperating with the curve of the link to preclude accidental disengagement and to allow immediate and ready disengagement when desired.

Since certain alterations in the above construction might be made without departing from the spirit of the invention, it is intended that all matter contained in the above description or shown in the accompanying drawings shall be interpreted as illustrative and not in a limiting sense.

I claim:

1. In a connecting device, in combination, a connecting hook link having a connecting eye with an elongated link receiving entry opening leading thereto, a cooperating connecting link having a curved connecting portion for entering said eye through said entry opening, said entry opening being of a length so its ends intercept an arc of said curved connecting portion of an altitude greater than the width of said entry opening so as to resist passage of the connecting link through the entry opening when the hook link and the connecting link lie in the line of stress of the connected parts, and the link strand at said curved connecting portion being slightly less in diameter than the width of said entry opening to permit free passage when said hook link and connecting link are displaced from said line of stress.

2. In a connecting device for the free ends of side members of anti-skid chains or the like, in combination, a hook-link provided with one or more open eyes, each having a restricted right-lined slot leading thereto, the plane of said slot being oblique to the center line of the link, a co-operating connecting link, said slot being so proportioned as to allow passage of said connecting link only when the body of said connecting link lies in the plane of said slot.

3. In a connecting device, in combination, a hook-link provided with an eye having a restricted entry slot therefor, a co-operating connecting link, the width of said slot being slightly greater than the diameter of the strand forming the connecting link, the sides of the hook-link intercepting a substantial portion of the curve of the connecting link-loop and thereby obstructing movement of said link into said slot in certain positions of the connecting link relatively to said hook-link while permitting movement in said slot in other positions thereof.

4. In a connecting device, in combination, a hook-link provided with an eye having a restricted entry slot leading thereto, a co-operating connecting link, said slot being of a width slightly greater than the diameter of the strand forming said connecting link and entering said eye obliquely to the center line of said hook-link, said hook-link being of sufficient thickness to intercept a substantial portion of the curve of the connecting link-loop and obstructing passage of said link into said slot in certain positions of the connecting link relatively to said hook-link, but permitting free passage of the link through the slot when the link lies in oblique position substantially in the plane of said slot.

5. In a connecting device, in combination, a hook-link provided with one or more open eyes having a restricted right-lined slot leading thereto, a co-operating connecting link, the width of said slot being slightly greater than the diameter of the strand forming said connecting link and less than the altitude of the segment of that portion of the curve of the connecting link-loop intercepted by the sides of said hook-link.

6. In combination, a connecting link having a curved strand and a receiving hook therefor of a thickness greater than the diameter of the link strand and having a right-lined slot and communicating larger recess, the width of said slot being greater than the diameter of the link strand and less than the altitude of the segment of that portion of the curve of the strand intercepted by the sides of the hook, whereby said link is permitted passage through said slot only when the plane of the link body is substantially parallel to the plane of the slot.

In testimony whereof I affix my signature, in the presence of two witnesses.

ANDREW LANGSTAFF JOHNSTON, Jr.

Witnesses:
H. M. SEAMANS,
L. A. WATSON.